(12) United States Patent
Arney et al.

(10) Patent No.: US 6,430,343 B1
(45) Date of Patent: Aug. 6, 2002

(54) SPLITTER FOR USE WITH AN OPTICAL AMPLIFIER

(75) Inventors: Susanne Arney, Highland Park; Jane Deborah LeGrange, Princeton, both of NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/287,475

(22) Filed: Apr. 6, 1999

(51) Int. Cl.[7] ................................................ G02B 6/42
(52) U.S. Cl. ............................ 385/48; 385/39; 385/18; 385/19; 359/160; 359/341.1
(58) Field of Search ............................. 385/48, 39, 18, 385/19, 123; 359/341, 160, 161, 290

(56) References Cited

U.S. PATENT DOCUMENTS 5,808,786 A * 9/1998 Shibuya ...................... 359/341
5,867,305 A * 2/1999 Waarts et al. ............... 359/341

FOREIGN PATENT DOCUMENTS

JP          09-160085       *    6/1997

* cited by examiner

*Primary Examiner*—Rodney Bovernick
*Assistant Examiner*—Sung Pak
(74) *Attorney, Agent, or Firm*—Lowenstein Sandler PC (57) ABSTRACT

An optical communication system which conserves electrical power is disclosed. Electrical power is conserved in the optical communication system by coupling a splitter to an optical amplifier. The optical amplifier is configured to receive optical signals as well as pump light. The splitter provides a portion of the pump light used in the optical amplifier to other devices (e.g., optical amplifiers, filters, modulators) of the optical communication system. Providing a portion of the pump light used in the optical amplifier to other devices in the optical communication systems conserves electric power by reducing the total electrical power needed to operate the optical communication system.

24 Claims, 4 Drawing Sheets

SPLITTER FOR USE WITH AN OPTICAL AMPLIFIER

FIELD OF THE INVENTION

The present invention relates generally to optical communications systems, and more particularly, to optical amplifiers.

BACKGROUND OF THE RELATED ART

Optical communication systems typically include a variety of devices (e.g., light sources, photodetectors, switches, optical fibers, modulators, amplifiers, and filters). For example, in the optical communication system 1 shown in FIG. 1, a light source 2, generates an optical signal. The optical signal comprises a series of light pulses. The light pulses are transmitted from the light source 2 to a detector 5. Typically, an optical fiber 4 transmits the light pulses from the light source 2 to the detector 5.

Figure 1:
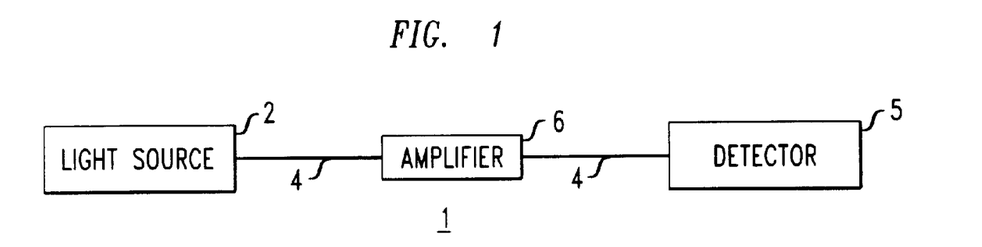
FIG. 1 shows an optical communication system including a light source, an optical amplifier, and a detector.

Many optical fibers are lossy in that they scatter (or absorb) portions of light pulses transmitted therealong (about 0.1–0.2 dB/km). When portions of the light pulses transmitted on an optical fiber are scattered (or absorbed), the optical power of such light pulses is reduced. To compensate for optical power losses attributable to the lossiness of optical fibers, optical amplifiers 6 are positioned along the length of the optical fibers 4. The optical amplifiers 6 increase the optical power of the light pulses so light pulses with adequate signal strengths propagate along the length of the optical fiber 4 from the light source 2 to the detector 5.

Optical amplifiers are also useful for transmitting optical signals through free space. Such free-space transmitters are useful for satellite communication links, building-to-building links, intra-city links, ship-to-pier links, and the like. The optical amplifiers provide the high power optical signals (about 100 milliwatts to about 10 watts) needed for transmission across such links.

Figure 2A:
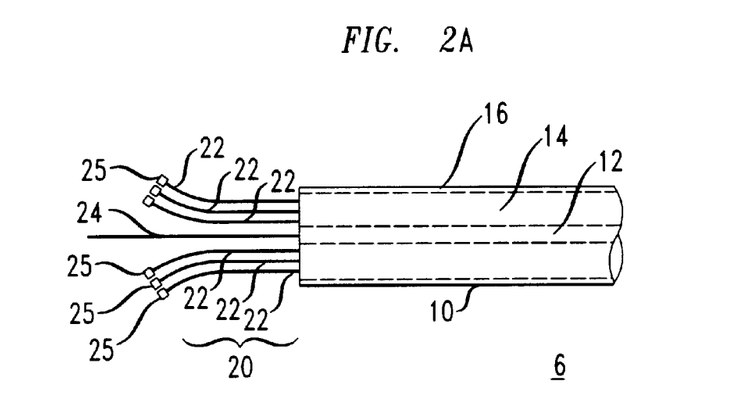
FIG. 2A shows a cut away view of an optical amplifier suitable for use in the optical communication system of FIG. 1 including a cladding pump fiber and a fiber bundle.

A cut away view of an optical amplifier 6 useful for optical communication systems or optionally as a free-space transmitter is shown in FIG. 2A. Optical amplifier 6 is a cladding pump optical amplifier. The cladding pump optical amplifier includes a cladding pump fiber 10 and a fiber bundle 20.

The fiber bundle 20 has of a plurality of multi-mode fibers 22 (e.g., 6–19) and a single mode fiber 24. The single mode fiber 24 is positioned at about the center of the fiber bundle 20. The multi-mode fibers 22 transmit pump light. The single mode fiber 24 transmits optical signals.

The plurality of multi-mode fibers 22 and the single mode fiber 24 are fused together into a bundle. The bundle has a diameter which is tapered to match the size and numerical aperture (NA) of the cladding pump fiber 10. The plurality of multi-mode fibers 22 proximate to the tapered end of the fiber bundle 20 are coupled to the cladding pump fiber 10.

A pump diode 25 is coupled to each multi-mode fiber 22 in the fiber bundle 20. The pump diode 25 is coupled to the distal end of the tapered fiber bundle 20. Pump diodes are semiconductor devices designed to emit light at specified wavelengths (e.g., 915 nanometers (nm), 980 nm).

Figure 2B:
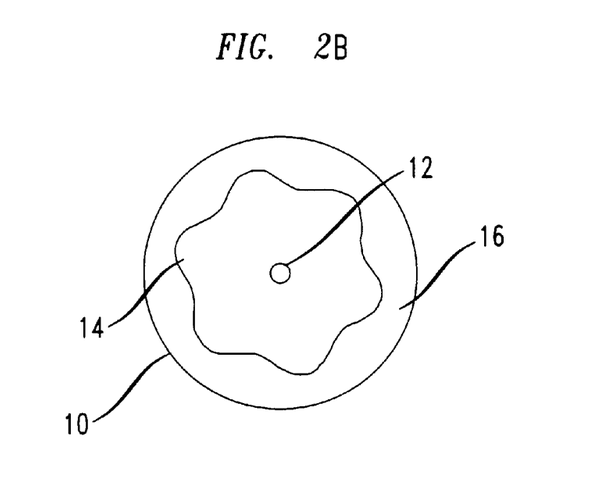
FIG. 2B depicts a cross-sectional view of the cladding pump fiber of FIG. 2A.

A cross-sectional view of the cladding pump fiber 10 is shown in FIG. 2B. The cladding pump fiber 10 includes a single mode core 12, first cladding 14, and second cladding 16. The single mode core 12 is made of silica that is doped with one or more ionized rare earth elements (e.g., $Nd^{3+}$, $Yb^{3+}$, $Tm^{3+}$, and $Er^{3+}$). The single mode core 12 typically has a diameter of about 4 µm to about 8 µm. The optical signal is transmitted from single mode fiber 24 to the single mode core 12.

The single mode core 12 is surrounded by first cladding 14. In FIG. 2B, the first cladding 14 is shown with a "star-shaped" cross-section. However, the first cladding 14 optionally has a "rectangular" (not shown) or a "D-shaped" (not shown) cross-section. First cladding 14 is typically made of silica with an index of refraction suitable for transmitting the pump light.

Pump light from the pump diodes 25 is provided to the first cladding 14 from the multi-mode fibers 22. As the pump light propagates through the first cladding 14, it excites the ionized rare earth elements in the single mode core 12, causing a population inversion. A population inversion is created when more electrons within the ionized rare earth elements are in the excited state than are in the ground state. The energy stored in the inverted population of excited rare earth elements is transferred to the optical signals propagating along the single mode core 12, causing the optical signals to experience an increase in optical power (i.e., a gain). In order to create the population inversion of ionized rare earth elements in the single mode core 12, the wavelength of the pump light must correspond to at least one absorption line for such ionized rare earth element. For example, pump light at 975 nm corresponds to an absorption line of erbium ($Er^{+3}$).

First cladding 14 is surrounded by second cladding 16. The second cladding 16 is made of a fluorinated, low index of refraction polymer or a low index of refraction glass. The second cladding 16 has an index of refraction that is different from the index of refraction for the first cladding 14. The differences in the indices of refraction for the first cladding 14 and the second cladding 16 substantially confines the pump light within the first cladding 14, preventing it from leaking out of the cladding pump fiber 10. For example, when the index of refraction for the first cladding 14 is about 1.46 and the index of refraction for the second cladding 16 is about 1.38, the difference between the two indices confines about 90% of the pump light in the first cladding.

The electrical efficiency of an optical amplifier is calculated as the ratio of the net optical power output from the amplifier to the power used to operate the pump diodes. The net optical power of the amplifier is defined as the amplifier output power minus the preamplifier power. The power used to operate the pump diodes is defined as the number of diodes times the current-voltage product per diode. For example, when a $Er^{+3}/Yb^{+3}$ cladding pump fiber pumped with six pump diodes (operated at about 1.7 volts and about 1.5 amps) amplifies a 1550 nm optical signal from a preamplifier power of about 120 mW to an output power of about 1.2 W, the $Er^{+3}/Yb^{+3}$ cladding pump fiber has an electrical efficiency of about 7% (electrical efficiency=(1.2 W—0.12 W)/(6 diodes x 1.7 volts×1.5 amps)×100). This means that only about 7% of the electrical power is used for amplifying optical signals input to the optical amplifier.

In some communications systems (e.g., satellite communication systems), there is a limited amount of electrical power available for system operation. Optical amplifiers with low electrical efficiencies (less than about 10%) are undesirable for use in such communications systems because they consume a substantial portion of the available power, which potentially reduces the power available to operate other devices in the system. Additionally, the cost of some communication systems is directly related to the electrical power needed to operate the devices therein. In particular, the cost of the communications system increases as the electrical power needed to operate the devices in the system increases. Accordingly, optical communication systems that provide greater efficiency are desired.

SUMMARY OF THE INVENTION

The present invention is directed to an optical communication system in which a beam splitter is used to direct a portion of the pump light provided to an optical amplifier in an optical communication system to at least one other device in the optical communication system. The beam splitter is configured to receive optical signals as well as pump light. The beam splitter directs a portion of the pump light provided to one optical amplifier in the optical communication system to other devices (e.g., optical amplifiers, filters, modulators) of the optical communication system. Directing a portion of the pump light provided to one optical amplifier in the optical communication system to other devices in the optical communication system conserves electric power by reducing the total electrical power needed to operate such optical communication system.

The optical amplifier has a structure in which a cladding pump fiber is coupled to a fiber bundle. The cladding pump fiber has a single mode core doped with an ionized rare earth element (e.g., $Nd^{3+}$, $Yb^{3+}$, $Tm^{3+}$, and $Er^{3+}$), a first cladding, and a second cladding. The first cladding surrounds the single mode core, while the second cladding surrounds the first cladding.

Optical signals are transmitted along the single mode core. Pump light is transmitted along the first cladding. The pump light in the first cladding excites the ionized rare earth elements in the single mode core, causing a population inversion among such ionized rare earth elements. Some of the energy stored in the inverted population of excited rare earth elements is transferred to the optical signals transmitted along the single mode core, increasing the optical power thereof.

The fiber bundle includes a plurality of multi-mode fibers and a single mode fiber that are fused together. The single mode fiber is preferably placed at about the center of the fiber bundle. Placing the single mode fiber at about the center of the fiber bundle facilitates the alignment between the single mode fiber and the single mode core when the fiber bundle is coupled to the cladding pump fiber. The first cladding is coupled to a source for pump light via one or more multi-mode fibers in the fiber bundle.

Pump diodes are optionally coupled to one or more of the multi-mode fibers in the fiber bundle. The pump diodes are a source of pump light for the optical amplifier.

Many optical amplifiers have low electrical efficiencies (less than about 10%). Thus, only a small portion of the electrical power provided to the optical amplifier from the pump diodes (less than about 10%) is used to amplify optical signals.

In one embodiment of the optical communication system of the present invention, a beam splitter is coupled to an output of the optical amplifier. The beam splitter is configured to receive both the amplified optical signals and the unused pump light from the optical amplifier. The beam splitter diverts a portion of the unused pump light to at least one other device in the optical communication system for use thereby.

The beam splitter diverts the portion of the unused pump light to other devices in the optical communication system using one or more layers of an at least partially reflective material on a substrate. The one or more layers of the at least partially reflective material preferably reflects light at the wavelength of the pump light. For example, when the pump light has a wavelength of about 975 nm, it is desirable that the one or more layers of the at least partially reflective material be made of a material which reflects light at a wavelength of about 975 nm. Examples of materials suitable for making the one or more layers of the at least partially reflective material include metals, dielectric materials, and polymers. Suitable substrate materials include silicon, fused silica, and quartz.

The beam splitter optionally diverts the portion of the unused pump light to the at least one other device in the optical communication system with patterned layers of the at least partially reflective material on the substrate. Patterning one or more of the layers of at least partially reflective material provides regions on the substrate that are reflective at the wavelength of the pump light as well as regions on the substrate that are not reflective at the wavelength of the pump light. The one or more layers are patterned for example by forming stripes of the partially reflective material on the substrate.

Alternatively, the beam splitter diverts the portion of the unused pump light using micro-mechanical layers. The term micro-mechanical as used in this description refers to at least partially reflective moveable layers on the substrate. When the at least partially reflective layers are micro-mechanical, the diversion of the pump light is controlled by the movement of such layers relative to the substrate. For example, the one or more layers of the at least partially reflective material are moveable relative to the substrate using an electrostatic attraction mechanism. Suitable electrostatic attraction mechanisms include parallel plate capacitive drives and comb capacitive drives.

In an alternate embodiment of the optical communication system of the present invention, the beam splitter is coupled at an input of the optical amplifier. When the beam splitter is coupled at the input of the optical amplifier, a portion of the pump light from one or more of the multi-mode fibers is transmitted to other devices in the optical communication system.

Other objects or features of the present invention will become apparent from the following detailed description considered in conjunction with the accompanying drawings. It is to be understood, however, that the drawings are designed solely for purposes of illustration and do not serve to limit the invention, for which reference should be made to the appended claims.

DETAILED DESCRIPTION

The present invention is directed to an optical communication system in which a beam splitter is used to direct a portion of the pump light provided to an optical amplifier in an optical communication system to at least one other device in the optical communication system. The beam splitter is configured to receive optical signals as well as pump light. The beam splitter directs a portion of the pump light provided to one optical amplifier in the optical communication system to other devices (e.g., optical amplifiers, filters, modulators) of the optical communication system. Directing a portion of the pump light provided to one optical amplifier in the optical communication system to other devices in the optical communication system conserves electric power by reducing the total electrical power needed to operate such optical communication system.

Figure 3:
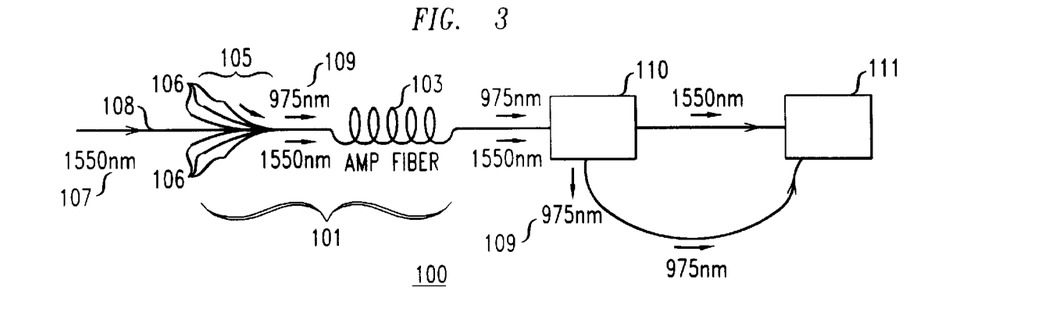
FIG. 3 shows the optical communication system of the present invention wherein a beam splitter is coupled to an output of an optical amplifier.

As shown in FIG. 3, the optical communication system 100 includes an optical amplifier 101 coupled to a beam splitter 110. Optical communication system 100 also includes a variety of devices 111. Devices 111 are optionally light sources, photodetectors, switches, modulators, and/or filters.

Optical signals 107 are transmitted in optical communication system 100 along optical fibers (not shown) coupled to the optical amplifier 101. The wavelength of the optical signals is variable.

Optical amplifier 101 has a structure which includes a cladding pump fiber 103 coupled to a fiber bundle 105. The cladding pump fiber 103 is coupled to the fiber bundle 105 with a splice (not shown).

The cladding pump fiber 103 includes a single mode core (not shown), a first cladding (not shown), and a second cladding (not shown). The first cladding surrounds the single mode core, while the second cladding surrounds the first cladding.

The single mode core is made of silica that is doped with one or more ionized rare earth elements (e.g., $Nd^{3+}$, $Yb^{3+}$, $Tm^{3+}$, and $Er^{3+}$). The single mode core has a diameter of about 4 $\mu$m to about 8 $\mu$m.

The first cladding is typically made of silica with an index of refraction suitable for transmitting the pump light. The first cladding has a cross-section whose shape is sufficient to capture at least about 95% of the pump light input thereto from the fiber bundle. Suitable shapes for the cross-sections of the first cladding are rectangular, star, and D-shaped. The second cladding is typically made of a fluorinated polymer or a glass. The second cladding has a refractive index that is different from that of the first cladding layer. The differences in the indices of refraction for the first cladding and the second cladding substantially confines the pump light within the first cladding, preventing it from leaking out of the cladding pump fiber.

Optical signals are transmitted along the single mode core. Pump light is transmitted along the first cladding. The pump light in the first cladding excites the ionized rare earth elements in the single mode core, causing a population inversion among such ionized rare earth elements. Some of the energy stored in the inverted population of excited rare earth elements is transferred to the optical signals transmitted along the single mode core, increasing the optical power thereof.

Referring to FIG. 3, the fiber bundle 105 includes a plurality of multi-mode fibers 106 and one single mode fiber 108. The plurality of multi-mode fibers 106 and the single mode fiber 108 are fused together. The single mode fiber 108 is preferably placed at about the center of the bundle. Placing the single mode fiber 108 at about the center of the bundle substantially aligns the single mode fiber 108 with the core of the cladding pump fiber 103 when the fiber bundle 105 is spliced thereto.

Optical pump diodes (not shown) are optionally coupled to each multi-mode fiber 106 in the fiber bundle 105. The optical pump diodes are a source of pump light 109 for the cladding pump fiber 103. The wavelength of the pump light is variable, however, its wavelength should be different from the wavelength of the optical signals. For example, the wavelengths for many optical signals is typically in the range of about 1300 nm to about 1590 nm, while the wavelengths of pump light is in the range of about 890 nm to about 990 nm. Suitable pump diodes are commercially available from SDL Company, San Jose, Calif., as well as Optopower Company, Tucson, Ariz.

Many optical amplifiers have low electrical efficiencies (less than about 10%). Thus, only a small portion of the electrical power provided to the optical amplifier from the pump diodes (less than about 10%) is used to amplify optical signals.

In one embodiment of the optical communication system of the present invention, a beam splitter 110 is coupled to an output of the optical amplifier 101. When the beam splitter 110 is coupled to the output of the optical amplifier 101, beam splitter 110 is adapted to receive both the amplified optical signals 107 and the unused pump light 109. The beam splitter 110 diverts at least a portion of the unused pump light 109 to at least one other device 111 in the optical communication system. The beam splitter 110 is transmissive for the wavelengths of the optical signals. Thus, while at least a portion of the pump light is diverted by the beam splitter 110, essentially all of the light at wavelengths of the optical signals is transmitted therethrough.

Devices 111 are then operated with the unused pump light diverted by the beam splitter 110. Providing a portion of the unused pump light 109 output from the optical amplifier to other devices 111 in the optical communication system conserves electric power by reducing the total electrical power needed to operate optical communication system 100.

The beam splitter 110 diverts at least a portion of the unused pump light 109 to devices 111 in the optical communication system 100 using one or more layers of an at least partially reflective material on a substrate. The one or more layers of the at least partially reflective material are selected to reflect only the wavelengths of pump light that are to be diverted. For example, when pump light at 975 $\mu$m is to be diverted, the one or more layers of the at least partially reflective material are selected to reflect light only in a range of wavelengths that includes 975 nm, while being transmissive for light at the wavelengths of the optical signals. Examples of materials suitable for making the one or more layers of the at least partially reflective material include metals (e.g., gold), dielectric materials (e.g., silicon nitride), and polymer layers (e.g., perfluoroether acrylates such as L-9367, fluorocarbon compounds such as FC-722, and surface modifiers such as FC-724, all available from 3M Company, St. Paul, Minn.). Suitable substrate materials include silicon, fused silica, and quartz.

The beam splitter 110 optionally diverts at least a portion of the unused pump light to the at least one other device in the optical communication system with patterned layers of the at least partially reflective material on a substrate. Patterning one or more of the layers of the at least partially reflective material provides regions on the substrate that are reflective at the wavelength of the pump light as well as regions on the substrate that are not reflective at the wavelength of the pump light. As such unused pump light impinging on regions of the substrate that are not reflective at the wavelength of the pump light is not reflected. The one or more layers are patterned for example by forming stripes of the partially reflective material on the substrate.

Alternatively, the beam splitter 110 diverts the portion of the unused pump light using micro-mechanical layers. The term micro-mechanical as used in this description refers to at least partially reflective moveable layers on the substrate. When the at least partially reflective layers are micro-mechanical, the diversion of the pump light is controlled by the movement of such layers relative to the substrate. That is, when the micro-mechanical layers are positioned in the path of the pump light, such pump light is reflected, and when the micro-mechanical layers are not positioned in the path of the pump light such light is not reflected. For example, polysilicon and/or silicon nitride are moveable relative to a silicon substrate using an electrostatic actuator mechanism.

Electrostatic actuators apply an electrostatic force between two electrodes of a capacitor to move the partially reflective layers relative to the substrate. One electrode is either formed by, or attached to the partially reflective layers and the other electrode is anchored to the substrate. Examples of suitable electrostatic actuators include a comb capacitive drive 140 and a parallel plate capacitive drive 150, shown in FIGS. 4A and 4B, respectively.

Figure 4A:
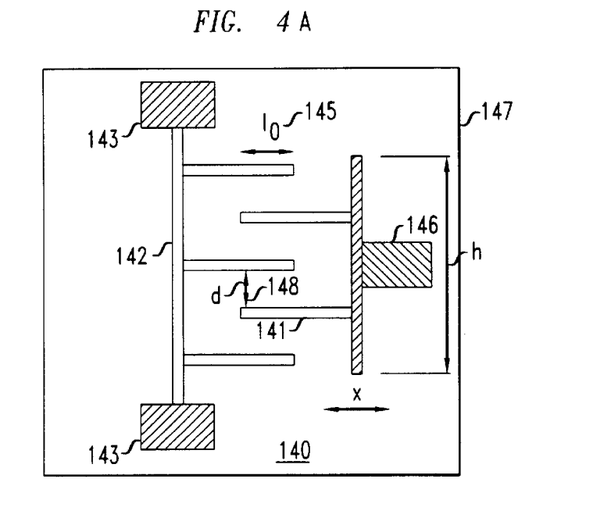
FIG. 4A depicts a cut away view of a substrate with a comb capacitive drive thereon.

For the comb capacitive drive 140, the two electrodes 141, 142 of the capacitor are interleaved fingers. Electrode 142 is attached to the substrate 147 at pads 143. Electrode 141 is attached to the partially reflective layers 146. Electrode 141 as well as the partially reflective layers 146 are moveable on the substrate 147 with respect to electrode 142. The capacitance between two of the interleaved fingers of electrodes 141, 142 is determined from $$C = C(x) = \frac{\varepsilon_0 (l_0 + x) h}{d} \quad (1)$$

where $\varepsilon_0$ is the permittivity of free space, $l_0$ is the overlap length (denoted as 145) of the interleaved fingers prior to the application of an electrostatic force, h is the height of the backbone of the comb to which is attached the partially reflective layers 146, d is the spacing between the interleaved fingers (denoted as 148), and x is the displacement of electrode 141 with respect to electrode 142. From equation (1), the capacitance between two of the interleaved fingers of electrodes 141, 142 is a linear function of the displacement, x. For any capacitive structure, the force (F) exerted on one electrode due to the other electrode is $$F = \frac{\partial \left(\frac{1}{2} C V^2\right)}{\partial x} \quad (2)$$

where C is the capacitance, V is the voltage, and x is the displacement. Substituting equation (1) into equation (2) provides $$F = \frac{\varepsilon_0 h V^2}{2d}. \quad (3)$$

Thus, for a comb capacitive drive, the force exerted by electrode 142 on electrode 141 to move the partially reflective layers 146 is independent of the displacement, x, and is only limited by the voltage applied to the electrodes 141, 142.

Figure 4B:
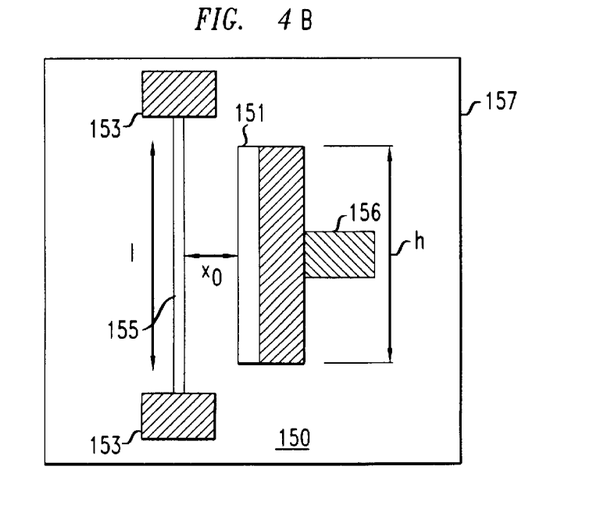
FIG. 4B depicts a cut away view of a substrate with a parallel plate capacitive drive thereon.

For the parallel plate capacitive drive 150, the two electrodes 155, 151 of the capacitor are parallel plates. Electrode 155 is attached to the substrate 157 at pads 153. Electrode 151 is attached to the partially reflective layers 156. Electrode 151 as well as the partially reflective layers 156 are moveable on the substrate 157 with respect to electrode 155. The capacitance between electrodes 155, 151 is determined from $$C = C(x) = \frac{\varepsilon_0 A}{x_0 + x} \quad (4)$$

where A=lh, and $x_0$ is the distance between the electrodes 155 and 151 prior to the application of an electrostatic force. From equation (4), the capacitance is inversely proportional to the displacement, x. Substituting equation (4) into equation (2) provides $$F = -\frac{\varepsilon_0 A V^2}{2} \frac{1}{(x_0 + x)^2}. \quad (5)$$

From equation (5), the force exerted by electrode 155 on electrode 151 to move the partially reflective layers 156 depends on $x_0$, the distance between electrodes 155 and 151. In particular, when $x_0$ increases the voltage required to move the reflective layers 156 also increases.

Other mechanisms suitable for moving one or more partially reflective layers relative to a substrate include rotary comb drives, linear scratch drives, rotary scratch drives, thermal bimorphs, electromagnetic drives, and shape-memory alloys. Illustrative devices are discussed in U.S. Pat. Nos. 5,500,761; 5,654,819; 5,589,974; 5,751,469; and 5,870,221; see also Marxer et al., "MHz Opto-Mechanical Modulator", Transducers '95-Eurosensors IX, Royal Swedish Academy of Eng. Sciences, Stockholm (June 1995), pp. 289–292.

Figure 5A:
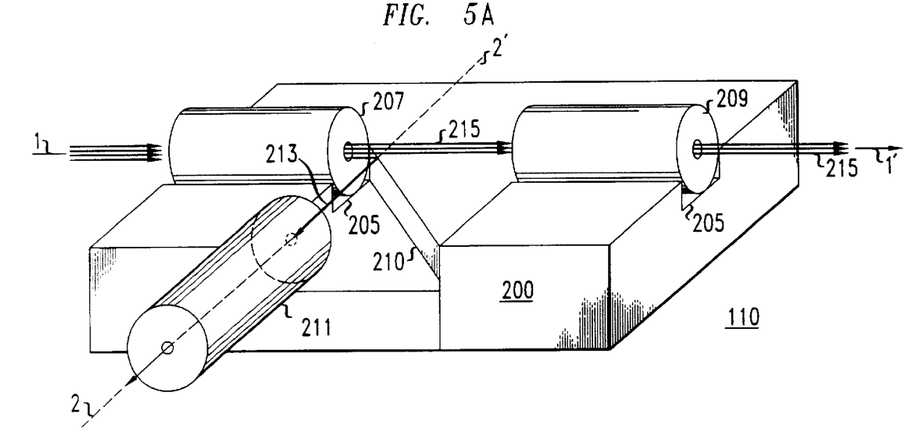
FIG. 5A illustrates one configuration for the structure of the beam splitter shown in FIG. 3.

A beam splitter 110 configuration suitable for diverting a portion of the unused pump light to devices in optical communication system 100, is shown in FIG. 5A. Beam splitter 110 includes a substrate 200 with a plurality of guides 205 and an at least partially reflective surface 210 formed thereon. The guides 205 support first and second optical fibers 207, 209. The guides 205 are also used to align optical fibers 207, 209 along an optical axis 1–1'. Optical signals and pump light are transmitted between optical fiber 207 and optical fiber 209 along a path 215 that is coextensive with optical axis 1–1'. Another optical fiber 211 is similarly attached to the substrate 200 along an optical axis 2–2' which is substantially orthogonal to optical axis 1–1'.

The guides 205 are square-shaped grooves formed in a top surface of the substrate 200. Guides 205 are optionally configured as v-shaped grooves (see FIG. 4B), rails (not shown), and/or channels (not shown). Suitable optical fibers include single-mode fibers and/or multi-mode fibers.

The at least partially reflective surface 210 comprises one or more layers of the at least partially reflective material formed on a surface of the substrate 200. The at least partially reflective surface 210 of the substrate 200 is positioned along path 215, between optical fiber 207 and optical fiber 209. The top edge of the at least partially reflective surface 210 blocks at least a portion of path 215. When the at least partially reflective surface 210 blocks a portion of path 215, it diverts a portion of the pump light 213 provided to the beam splitter 110 through optical fiber 207. The diverted portion of the pump light 213 is transmitted away from optical axis 1–1' into optical fiber 211 for use by other devices in the optical communication system. The unblocked portion of the pump light and the optical signals are transmitted along optical axis 1–1' to optical fiber 209.

The at least partially reflective surface 210 of substrate 200 optionally blocks path 215. When path 215 between the optical fiber 207 and optical fiber 209 is completely blocked by substrate 200, the material comprising substrate 200 affects the transmission of the optical signals along optical axis 1–1'. To facilitate such transmission of the optical signals along optical axis 1–1' from optical fiber 207 to optical fiber 209, the substrate 200 is preferably made of a material that is transparent to the wavelength range of the optical signals. In particular, fused silica and/or silicon dioxide are transparent to light in the operating wavelength range typically used for the optical signals (above about 1000 μm).

The at least partially reflective surface 210 of beam splitter 110 is positioned at an angle that is variable relative to optical axis 1–1'. Positioning the at least partially reflective surface 210 of beam splitter 110 at an angle relative to optical axis 1–1', diverts the pump light into optical fiber 211 for use by other devices in the optical communication system. Suitable angles for the at least partially reflective surface 210 include angles in a range of about 3° to about 90°.

Figure 5B:
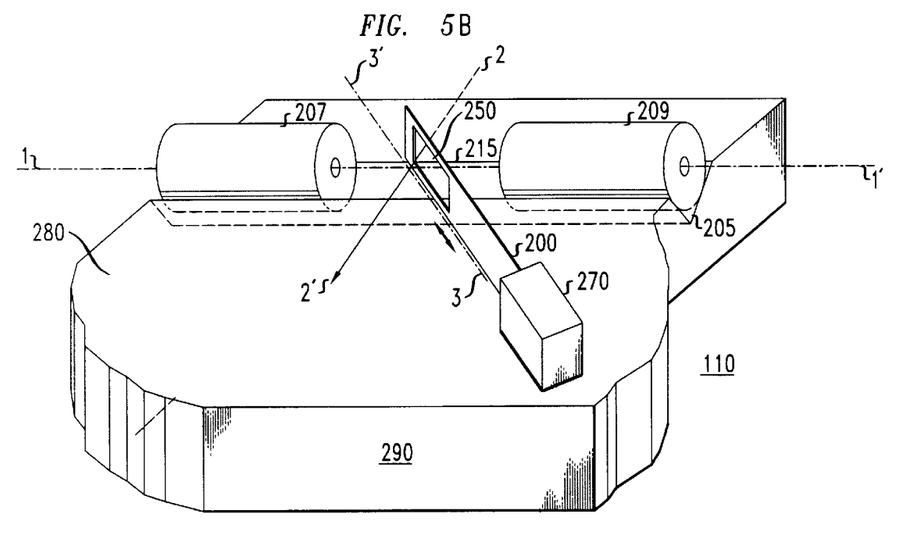
FIG. 5B illustrates an alternate configuration for the structure of the beam splitter shown in FIG. 3.

An alternate beam splitter 110 configuration suitable for transmitting a portion of the pump light to devices 111 in optical communication system 100, is shown in FIG. 5B. Beam splitter 110 is configured so that the at least partially reflective surface formed on the substrate completely blocks path 215 between optical fiber 207 and optical fiber 209.

Referring to FIG. 5B, beam splitter 110 includes a substrate 290, a guide 205, a housing 270, and an at least partially reflective surface 250 formed on a moveable arm 300. Guide 205 is a v-shaped groove formed in the surface of substrate 290. Guide 205 supports first and second optical fibers 207, 209. The guide 205 is used to align the optical fibers 207, 209 along optical axis 1–1'.

The housing 270 is attached on surface 280 of substrate 290. Housing 270 supports moveable arm 300. The movable arm 300, on which is formed the at least partially reflective surface 250, completely blocks path 215 between optical fiber 207 and optical fiber 209. Housing 270 supports the moveable arm 300 in an upright position that is substantially orthogonal to the surface 280 of substrate 290.

When path 215 between the optical fiber 207 and optical fiber 209 is completely blocked by the moveable arm 300, the material comprising the moveable arm 300 affects the transmission of pump light and/or the optical signals therethrough. In particular, silicon absorbs light over the operating wavelength range typically used for the pump light (below about 1000 μm). When non-reflected pump light is to be transmitted along optical axis 1–1'from optical fiber 207 to optical fiber 209, a transmissive window is formed in the reflective surface of the silicon substrate. The transmissive window is formed, for example, by etching the silicon substrate using potassium hydroxide (KOH), or optionally etching the silicon substrate using solutions of ethylenediamine propionic acid (EDPA), tetramethylammonium hydroxide (TMAH), or a mixture of hydrofluoric acid/nitric acid/acetic acid (HF/HNO$_3$/CH$_3$COOH). The silicon substrate is optionally etched using a chlorine or fluorine based plasma.

The moveable arm 300 with the at least partially reflective surface 250 thereon is positioned at an angle that is variable with respect to optical axis 1–1'. The reflected portion of the pump light is transmitted along optical axis 2–2', to an optical fiber (not shown).

The housing 270 optionally moves the moveable arm 300 relative to the substrate 290. Suitable housings potentially include fixing structures such as anchors, locking-plates with detents, hinged locking-plates and epoxy, together with various combinations of actuators and springs which enable the optional movement of housing 270. Examples of such housings are discussed in U. S. Pat. Nos. 5,824,910; 5,646,464; and 4,746,242.

Figure 6:
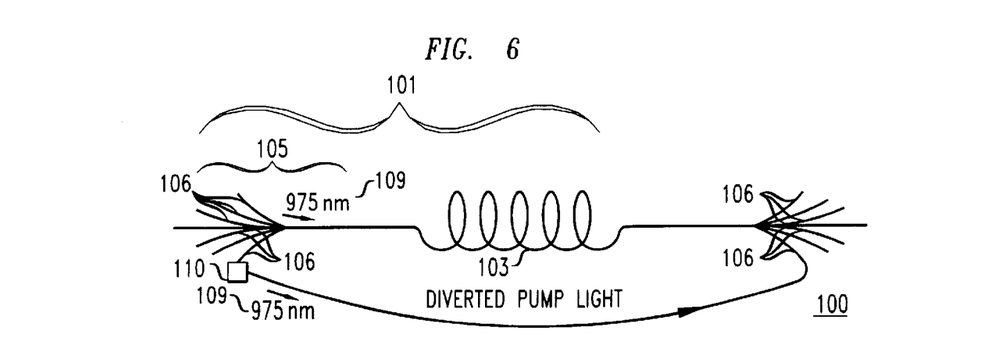
FIG. 6 shows the optical communication system of the present invention wherein the beam splitter is coupled to an input of the optical amplifier.

In an alternate embodiment of the optical communication system of the present invention, the beam splitter 110 is coupled at an input of the optical amplifier 101, as shown in FIG. 6. When the beam splitter 110 is coupled at an input of the optical amplifier 101, the beam splitter 110 is adapted to receive at least a portion of the pump light 109 provided to the optical amplifier from one or more multi-mode fibers 106 in the fiber bundle 105. The remaining portion of the pump light 109 in the fiber bundle 105 is provided to the cladding pump fiber 103. The portion of the pump light received by the beam splitter is transmitted to other devices in the optical communication system.

The following example is provided to illustrate a specific embodiment of the present invention.

Example 1

Simulation studies were performed for two dielectric coatings A and B. Each coating consisted of multiple layers of a dielectric material. The simulations were performed by Evaporated Coatings Inc., Willow Grove, Pa.

Figure 7A:
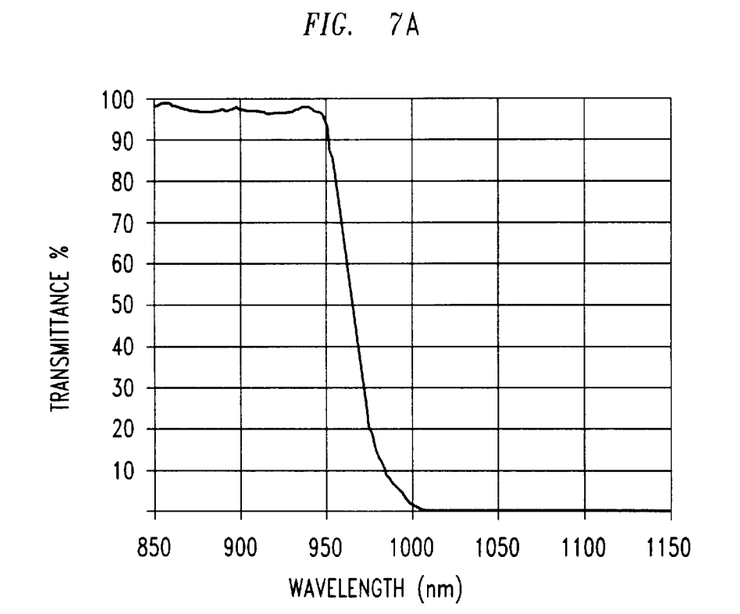
FIG. 7A is a graph of transmittance plotted as a function of wavelength for dielectric coating A of Example 1.

FIG. 7A is a graph of the transmittance of dielectric coating A plotted as a function of wavelength. The multiple layers of the dielectric material had a transmittance of about 100% for light having a wavelength less than about 950 nm. Correspondingly, essentially all the light at wavelengths greater than about 950 nm is reflected (nearly zero transmittance) by dielectric coating A.

Figure 7B:
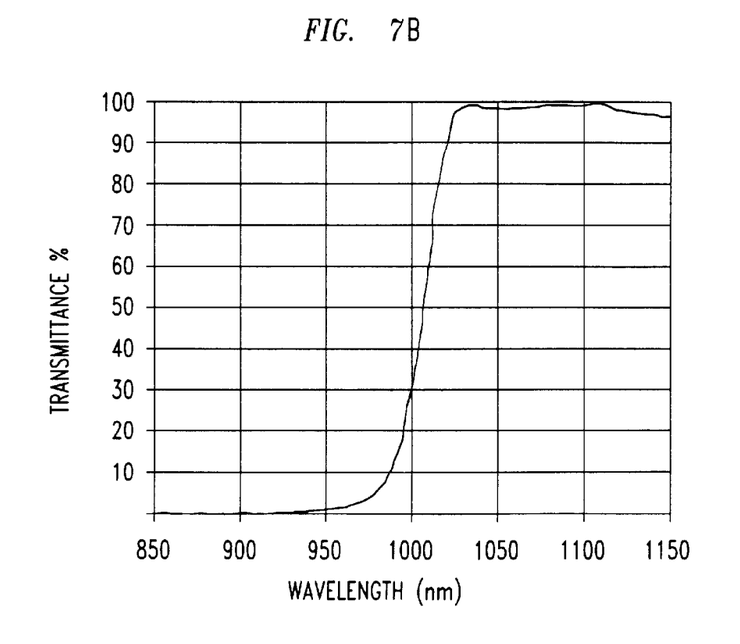
FIG. 7B is a graph of transmittance plotted as a function of wavelength for dielectric coating B of Example 1.

FIG. 7B is a graph of the transmittance of dielectric coating B plotted as a function of wavelength. The multiple layers of the dielectric material had a transmittance of about 100% for light having a wavelength greater than about 1020 nm. This means that about 100% of the light at wavelengths greater than about 1020 nm are transmitted by dielectric coating B. Essentially none of the light at wavelengths greater than about 1020 nm is reflected by coating B.

Both coating A and coating B have about 10% transmittance at about 980 nm, corresponding to a reflectance of about 90% at about 980 nm.

The invention claimed is:

1. An optical communication system comprising:
   an optical amplifier wherein the optical amplifier is adapted to receive optical signals as well as multimode pump light,
   a splitter, wherein the splitter is coupled to the optical amplifier and wherein the splitter is configured to divert at least a portion of the multimode pump light provided to the optical amplifier to one or more devices in the optical communication system for use thereby;

the splitter comprising a micromechanically formed reflector that is reflective for the multimode pump light, the reflector disposed in the path to or from the optical amplifier and oriented to divert a portion of the multimode pump light onto a oath to the one or more devices.

2. The optical communication system of claim 1 wherein the splitter is coupled to an output of the optical amplifier.

3. The optical communication system of claim 1 wherein the splitter is coupled to an input of the optical amplifier.

4. The optical communication system of claim 1 wherein the optical amplifier comprises a cladding pump fiber coupled to a fiber bundle.

5. The optical communication system of claim 4 wherein the splitter is coupled to the cladding pump fiber.

6. The optical communication system of claim 4 wherein the fiber bundle includes a plurality of multi-mode fibers.

7. The optical communication system of claim 6 wherein the splitter is coupled to at least one of the plurality of multi-mode fibers.

8. The optical communication system of claim 1 wherein the splitter includes one or more layers of an at least partially reflective material on a substrate.

9. The optical communication system of claim 8 wherein the one or more layers of the at least partially reflective material are selected from the group consisting of metal, dielectric material, and polymer.

10. The optical communication system of claim 8 wherein the one or more layers of the at least partially reflective material are patterned.

11. The optical communication system of claim 8 wherein the one or more layers of the at least partially reflective material are moveable relative to the substrate.

12. The optical communication system of claim 11 wherein the one or more layers of the at least partially reflective material are moveable relative to the support using a mechanism selected from the group consisting of a parallel plate capacitive drive, a comb capacitive drive, a rotary comb drive, a linear scratch drive, a rotary scratch drive, thermal bimorphs, an electromagnetic drive, and shape-memory alloys.

13. A method of operating an optical communication system comprising the steps of:

providing an optical amplifier, wherein the optical amplifier is adapted to receive optical signals as well as multimode pump light; and providing a splitter, wherein the splitter is coupled to the optical amplifier and wherein the splitter is configured to divert at least a portion of the multimode pump light provided to the optical amplifier to one or more devices in the optical communication system for use thereby, the splitter comprising a micromechanically formed reflector that is reflective for the multimode pump light, the reflector disposed in the output path to or from the optical amplifier and oriented to divert a portion of the multimode pump light onto a path to the one or more devices.

14. The method of claim 13 Wherein the splitter is coupled to an output of the optical amplifier.

15. The method of claim 13 wherein the splitter is coupled to an input of the optical amplifier.

16. The method of claim 13 wherein the optical amplifier comprises a cladding pump fiber coupled to a fiber bundle.

17. The method of claim 12 wherein the splitter is coupled to the cladding pump fiber.

18. The method of claim 16 wherein the fiber bundle includes a plurality of multi-mode fibers.

19. The method of claim 18 wherein the splitter is coupled to at least one of the plurality of multi-mode fibers.

20. The method of claim 13 wherein the splitter includes one or more layers of an at least partially reflective material on a substrate.

21. The method of claim 20 wherein the one or more layers of the at least partially reflective material are selected from the group consisting of metal, dielectric material, and polymer.

22. The method of claim 20 wherein the one or more layers of the at least partially reflective material are patterned.

23. The method of claim 20 wherein the one or more layers of the at least partially reflective material are moveable relative to the substrate.

24. The method of claim 23 wherein the one or more layers of the at least partially reflective material are moveable relative to the substrate using a mechanism selected from the group consisting of a parallel plate capacitive drive, a comb capacitive drive, a rotary comb drive, a linear scratch drive, a rotary scratch drive, thermal bimorphs, an electromagnetic drive, and shape-memory alloys.

* * * * *